(12) United States Patent
Schmidt (10) Patent No.: US 12,454,191 B2
(45) Date of Patent: Oct. 28, 2025

(54) METHOD, APPARATUS, SYSTEM, ELECTRIC VEHICLE, COMPUTER PROGRAM AND STORAGE MEDIUM FOR CHARGING OR DISCHARGING A CELL OF AN ELECTRIC ENERGY STORE BY CONSIDERING A COMPLEX IMPEDANCE AND A TEMPERATURE CHARACTERISTIC OF THE ENERGY STORE

(71) Applicant: Bayerische Motoren Werke Aktiengesellschaft, Munich (DE)

(72) Inventor: Jan Philipp Schmidt, Holzmaden (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 812 days.

(21) Appl. No.: 17/784,058

(22) PCT Filed: Nov. 9, 2020

(86) PCT No.: PCT/EP2020/081472
§ 371 (c)(1),
(2) Date: Jun. 9, 2022

(87) PCT Pub. No.: WO2021/115694
PCT Pub. Date: Jun. 17, 2021

(65) Prior Publication Data
US 2023/0042256 A1 Feb. 9, 2023

(30) Foreign Application Priority Data
Dec. 11, 2019 (DE) ...................... 10 2019 133 921.9

(51) Int. Cl.
*B60L 53/62* (2019.01)
*G01R 31/367* (2019.01)
(Continued)

(52) U.S. Cl.
CPC ............ *B60L 53/62* (2019.02); *G01R 31/367* (2019.01); *G01R 31/389* (2019.01);
(Continued)

(58) Field of Classification Search
CPC .. G01R 31/367; G01R 31/389; G01R 31/396; H01M 10/443; H01M 10/486; H02J 7/0047; H02J 7/007192; B60L 53/62
(Continued)

(56) References Cited

U.S. PATENT DOCUMENTS 4,795,968 A * 1/1989 Madou ................. G01N 27/227
324/71.5
7,593,823 B2 * 9/2009 Iwane .................. G01R 31/392
320/132

(Continued)

FOREIGN PATENT DOCUMENTS

CN 109884532 A 6/2019
DE 10 2009 054 132 A1 5/2011
(Continued)

OTHER PUBLICATIONS

Korean-language Office Action issued in Korean Application No. 10-2022-7010549 dated May 22, 2024 with English Translation (10 pages).
(Continued)

*Primary Examiner* — John T Trischler
(74) *Attorney, Agent, or Firm* — Crowell & Moring LLP (57) ABSTRACT

A method for charging a cell of an electric energy store includes setting the cell into a charging mode; determining a first and a second impedance characteristic, each representative of a complex alternating current impedance of the cell; determining a first and a second temperature characteristic on the basis of the impedance characteristics, each representative of a temperature of the cell; determining a
(Continued)

deviation in the temperature characteristics; and reducing a charging current of the cell in the event that the deviation exceeds a specified temperature threshold value.

14 Claims, 8 Drawing Sheets

(51) Int. Cl.
| | |
|---|---|
| *G01R 31/389* | (2019.01) |
| *G01R 31/396* | (2019.01) |
| *H01M 10/44* | (2006.01) |
| *H01M 10/48* | (2006.01) |
| *H02J 7/00* | (2006.01) |
| *G01R 27/02* | (2006.01) |
| *G01R 31/36* | (2020.01) |
| *G01R 31/374* | (2019.01) |
| *G01R 31/392* | (2019.01) |
| *H01M 10/0525* | (2010.01) |
| *H01M 10/46* | (2006.01) |

(52) U.S. Cl.
CPC ........ *G01R 31/396* (2019.01); *H01M 10/443* (2013.01); *H01M 10/486* (2013.01); *H02J 7/0047* (2013.01); *H02J 7/007192* (2020.01); *B60L 2240/545* (2013.01); *G01R 27/02* (2013.01); *G01R 31/3648* (2013.01); *G01R 31/374* (2019.01); *G01R 31/392* (2019.01); *H01M 10/0525* (2013.01); *H01M 10/46* (2013.01); *H01M 2220/20* (2013.01); *H02J 7/00047* (2020.01); *H02J 7/00309* (2020.01); *H02J 7/0048* (2020.01)

(58) Field of Classification Search
USPC .................................................. 320/109
See application file for complete search history.

(56) References Cited

U.S. PATENT DOCUMENTS

| | | | | |
|---|---|---|---|---|
| 7,626,394 B2* | 12/2009 | Kimura | ............... | G01R 31/3842 320/132 |
| 8,129,996 B2* | 3/2012 | Iwane | ................... | G01R 31/392 324/427 |
| 8,489,264 B2* | 7/2013 | Morita | .................... | B60L 58/10 320/136 |
| 8,638,070 B2* | 1/2014 | Maluf | ....................... | H02J 7/00 320/141 |
| 8,947,023 B2* | 2/2015 | Kawahara | ......... | H01M 10/6563 429/11 |
| 8,965,721 B2* | 2/2015 | Paryani | ................. | G01R 31/389 324/426 |
| 8,975,874 B2* | 3/2015 | Berkowitz | ............... | H02J 7/00 320/141 |
| 8,994,340 B2* | 3/2015 | Matthe | ................. | H01M 10/486 320/152 |
| 9,091,739 B2* | 7/2015 | Iwane | ................. | G01R 31/3842 |
| 9,145,059 B2* | 9/2015 | Gibbs | ..................... | B60L 50/64 |
| 9,194,919 B2* | 11/2015 | Uesaka | ............... | H02J 7/00047 |
| 9,229,061 B2* | 1/2016 | Hebiguchi | ............... | G01K 7/42 |
| 9,373,972 B2* | 6/2016 | Ghantous | .......... | H02J 7/007184 |
| 9,385,555 B2* | 7/2016 | Ghantous | ................ | G01R 31/36 |
| 9,453,887 B2* | 9/2016 | Koba | ................. | G01R 31/385 |
| 9,673,657 B2* | 6/2017 | van Lammeren | ... | H02J 7/00712 |
| 9,846,203 B2* | 12/2017 | Saito | ................... | F02N 11/0862 |
| 10,046,664 B2* | 8/2018 | Komiyama | .......... | G01R 31/389 |
| 10,207,596 B2* | 2/2019 | Lin | ........................ | B60L 58/16 |
| 10,379,170 B2* | 8/2019 | Nagaoka | ............. | H01M 10/486 |
| 10,601,085 B2* | 3/2020 | Lim | .................... | H01M 50/569 |
| 10,649,036 B2* | 5/2020 | Oguma | ................ | G01R 31/374 |
| 10,651,513 B2* | 5/2020 | Kellermann | ............. | B60L 3/12 |
| 10,698,035 B2* | 6/2020 | Schmidt | ............. | G01R 31/3835 |
| 10,718,817 B2* | 7/2020 | Oguma | ................ | G01R 31/389 |
| 10,775,442 B2* | 9/2020 | Schlasza | ............ | G01R 31/3842 |
| 10,847,988 B2* | 11/2020 | Shimura | ........... | H01M 10/0431 |
| 10,892,630 B2* | 1/2021 | Takagi | ................. | H02J 7/0068 |
| 10,976,372 B2* | 4/2021 | Koba | ................... | G01R 31/389 |
| 10,998,585 B2* | 5/2021 | Akaishi | ............... | H01M 10/425 |
| 11,079,441 B2* | 8/2021 | Endo | ......................... | H02J 7/00 |
| 11,262,414 B2* | 3/2022 | Schmidt | .................... | B60L 3/12 |
| 11,316,192 B2* | 4/2022 | Imade | ............... | H01M 10/0431 |
| 11,327,119 B2* | 5/2022 | Pressas | ................ | H02J 7/00711 |
| 11,340,303 B2* | 5/2022 | Heuser | ................ | G01R 31/392 |
| 11,385,294 B2* | 7/2022 | Boss | .................... | G01R 31/392 |
| 11,402,433 B2* | 8/2022 | Naha | .................... | G01R 31/392 |
| 11,411,415 B2* | 8/2022 | Seo | ...................... | H02J 7/00034 |
| 11,506,720 B2* | 11/2022 | Schmidt | .............. | G01R 31/389 |
| 11,602,975 B2* | 3/2023 | Choi | ................... | H01M 10/625 |
| 11,604,227 B2* | 3/2023 | Kalin | ..................... | B60L 3/12 |
| 11,607,963 B2* | 3/2023 | Andre | ................. | H02J 7/00711 |
| 11,719,755 B2* | 8/2023 | Pressas | .............. | G01R 31/3842 324/430 |
| 11,860,235 B2* | 1/2024 | Sano | .................. | G01R 31/3648 |
| 11,901,555 B2* | 2/2024 | Li | ........................ | H01M 4/505 |
| 11,927,663 B2* | 3/2024 | Hammerschmidt | . | G01R 31/396 |
| 11,936,233 B2* | 3/2024 | Lim | .................. | H02J 7/007186 |
| 11,951,866 B2* | 4/2024 | Mueller | ................. | B60L 58/10 |
| 12,000,903 B2* | 6/2024 | Schmidt | ................. | G01R 31/367 |
| 12,055,593 B2* | 8/2024 | Roemersperger | ..... | H01M 10/48 |
| 2008/0120050 A1* | 5/2008 | Iwane | ................... | G01R 31/392 320/136 |
| 2008/0204031 A1* | 8/2008 | Iwane | ................... | G01R 31/389 324/430 |
| 2010/0045298 A1* | 2/2010 | Iwane | ................ | G01R 31/3842 320/132 |
| 2010/0250038 A1* | 9/2010 | Morita | .................... | B60L 58/12 320/136 |
| 2011/0077879 A1* | 3/2011 | Paryani | ................. | H02J 7/0071 320/162 |
| 2011/0285356 A1 | 11/2011 | Maluf et al. | | |
| 2012/0256569 A1* | 10/2012 | Kawahara | ........... | H01M 10/613 374/142 |
| 2012/0265462 A1* | 10/2012 | Iwane | ................... | G01R 31/392 702/63 |
| 2013/0063094 A1* | 3/2013 | Gibbs | ..................... | B60L 50/66 320/134 |
| 2013/0156072 A1* | 6/2013 | Hebiguchi | ........... | G01R 31/382 374/183 |
| 2013/0307487 A1 | 11/2013 | Matthe et al. | | |
| 2014/0139192 A1* | 5/2014 | Berkowitz | ........ | H02J 7/007184 320/141 |
| 2014/0379188 A1* | 12/2014 | Uesaka | ............... | G01R 31/389 320/134 |
| 2015/0145521 A1* | 5/2015 | Koba | .................... | H01M 10/443 29/593 |
| 2015/0155734 A1* | 6/2015 | Ghantous | .................. | H02J 7/00 320/162 |
| 2015/0288213 A1* | 10/2015 | van Lammeren | ... | H01M 10/486 320/153 |
| 2015/0380957 A1* | 12/2015 | Ghantous | ................ | G01R 31/36 320/134 |
| 2016/0011275 A1* | 1/2016 | Saito | ................... | F02N 11/0862 324/430 |
| 2016/0069963 A1* | 3/2016 | Hebiguchi | ........... | G01R 31/389 324/430 |
| 2016/0375790 A1* | 12/2016 | Komiyama | ............. | B60L 58/12 320/136 |
| 2017/0104248 A1* | 4/2017 | Lim | ...................... | H01M 10/486 |
| 2017/0113565 A1* | 4/2017 | Lin | ........................ | B60L 58/16 |
| 2017/0234935 A1* | 8/2017 | Schmidt | ............... | G01R 31/389 324/430 |
| 2017/0271724 A1* | 9/2017 | Schmidt | ............... | H01M 50/414 |
| 2018/0017626 A1* | 1/2018 | Heuser | ................ | B60R 16/03 |
| 2018/0038918 A1* | 2/2018 | Nagaoka | ................ | H02J 7/00 |
| 2018/0062211 A1* | 3/2018 | Kellermann | ............. | B60L 3/12 |
| 2018/0156872 A1* | 6/2018 | Oguma | ............... | G01R 31/392 |
| 2018/0264956 A1* | 9/2018 | Takagi | .................. | H02J 7/0068 |
| 2018/0275201 A1* | 9/2018 | Oguma | ................ | G01R 31/387 |
| 2019/0036373 A1* | 1/2019 | Shimura | ........... | H01M 10/0525 |

(56) References Cited

U.S. PATENT DOCUMENTS

| | | | |
|---|---|---|---|
| 2019/0146039 A1* | 5/2019 | Schmidt | H01M 10/482 |
| | | | 324/430 |
| 2019/0154764 A1* | 5/2019 | Schlasza | G01R 31/392 |
| 2019/0190066 A1* | 6/2019 | Imade | H01M 10/613 |
| 2019/0195957 A1* | 6/2019 | Chiba | G01R 31/367 |
| 2019/0195960 A1* | 6/2019 | Koba | G01R 31/389 |
| 2019/0260092 A1* | 8/2019 | Akaishi | H01M 10/4257 |
| 2019/0293723 A1* | 9/2019 | Pressas | H02J 7/04 |
| 2020/0079239 A1* | 3/2020 | Mueller | B60L 50/66 |
| 2020/0217902 A1* | 7/2020 | Schmidt | B60L 3/0007 |
| 2020/0259354 A1* | 8/2020 | Uchida | H02J 7/00714 |
| 2021/0063490 A1* | 3/2021 | Naha | G01R 31/367 |
| 2021/0088596 A1* | 3/2021 | Endo | G01R 31/367 |
| 2021/0123978 A1* | 4/2021 | Boss | G01R 31/392 |
| 2021/0255250 A1* | 8/2021 | Schmidt | G01R 31/389 |
| 2021/0276434 A1* | 9/2021 | Andre | B60L 58/27 |
| 2021/0367433 A1* | 11/2021 | Seo | H02J 7/00034 |
| 2021/0402849 A1* | 12/2021 | Choi | H01M 10/613 |
| 2022/0006314 A1* | 1/2022 | Lim | H02J 7/00714 |
| 2022/0120816 A1* | 4/2022 | Kalin | G01R 31/006 |
| 2022/0158263 A1* | 5/2022 | Schmidt | G01N 27/301 |
| 2022/0163613 A1* | 5/2022 | Hammerschmidt | G01R 31/396 |
| 2022/0190622 A1* | 6/2022 | Kobayashi | H02J 7/007194 |
| 2022/0196750 A1* | 6/2022 | Sano | G01R 31/3648 |
| 2022/0221521 A1* | 7/2022 | Pressas | G01R 31/3842 |
| 2022/0365142 A1* | 11/2022 | Schmidt | G01R 27/28 |
| 2022/0385095 A1* | 12/2022 | Nuernberger | G01R 31/396 |
| 2023/0039506 A1* | 2/2023 | Lee | H02J 7/00309 |
| 2023/0163296 A1* | 5/2023 | Li | H01M 50/204 |
| | | | 429/149 |
| 2024/0085485 A1* | 3/2024 | Roemersperger | G01R 31/367 |
| 2024/0234845 A1* | 7/2024 | Moon | H01M 50/204 |
| 2024/0239233 A1* | 7/2024 | Wang | H01M 10/486 |
| 2024/0322277 A1* | 9/2024 | Moon | H01M 10/486 |
| 2024/0418789 A1* | 12/2024 | Salehi | G01R 31/392 |
| 2025/0020728 A1* | 1/2025 | Kitagawa | G01R 31/382 |
| 2025/0102588 A1* | 3/2025 | Aquilano | G01R 31/392 |
| 2025/0116717 A1* | 4/2025 | Son | G01R 31/389 |

FOREIGN PATENT DOCUMENTS

| | | |
|---|---|---|
| DE | 10 2013 103 921 A1 | 11/2013 |
| DE | 10 2014 217 135 A1 | 3/2016 |
| DE | 10 2015 111 195 A1 | 1/2017 |
| EP | 1 933 158 A1 | 6/2008 |
| EP | 2 306 214 A2 | 4/2011 |
| JP | 2007-108063 A | 4/2007 |
| JP | 2010-243481 A | 10/2010 |
| KR | 10-2015-0115668 A | 10/2015 |
| WO | WO 2013/018641 A1 | 2/2013 |
| WO | WO 2015/005141 A1 | 1/2015 |

OTHER PUBLICATIONS

Japanese-language Office Action issued in Japanese Application No. 2022-526453 dated Oct. 30, 2024 with English translation (6 pages).
International Search Report (PCT/ISA/210) issued in PCT Application No. PCT/EP2020/081472 dated Feb. 11, 2021 with English translation (seven (7) pages).
German-language Written Opinion (PCT/ISA/237) issued in PCT Application No. PCT/EP2020/081472 dated Feb. 11, 2021 (five (5) pages).
German-language Search Report issued in German Application No. 10 2019 133 921.9 dated Sep. 3, 2020 with partial English translation (16 pages).

* cited by examiner

METHOD, APPARATUS, SYSTEM, ELECTRIC VEHICLE, COMPUTER PROGRAM AND STORAGE MEDIUM FOR CHARGING OR DISCHARGING A CELL OF AN ELECTRIC ENERGY STORE BY CONSIDERING A COMPLEX IMPEDANCE AND A TEMPERATURE CHARACTERISTIC OF THE ENERGY STORE

BACKGROUND AND SUMMARY OF THE INVENTION

Present developments relate to the fast-charging function for the accelerated charging of an electric vehicle. In this case, one or more battery cells of the electric vehicle are operated at the limits of their specification, which can result in potential damage to the respective battery cells if these limits are exceeded.

An object on which the invention is based is to provide a simultaneously efficient and safe method for charging a cell of an electric energy store, which method contributes, in particular, to avoiding cell-damaging charging current intensities in the (ultra)fast-charging mode without computing-intensive control of the charging current. Moreover, the intention is to specify a method for efficiently and safely discharging the cell and also to provide an apparatus corresponding to the methods, a system, an electric vehicle, a computer program and a computer-readable storage medium.

The objects are achieved by the claimed invention.

According to a first aspect, the invention relates to a method for charging a cell of an electric energy store. An electric energy store can be considered to be, in particular, an energy store for an electric vehicle, for example a secondary battery based on lithium ion technology. In this case, the energy store may comprise, in particular, a plurality of cells or cell groups which are arranged in a battery pack. The method described below on the basis of a single cell can also be analogously applied to a plurality of cells or cell groups.

In the method, in a step A1), the cell is changed to a charging mode in which a charging current is supplied to the cell.

Then, in a step B1) following step A1), a first impedance characteristic value and a second impedance characteristic value are determined during the charging mode. The first impedance characteristic value and the second impedance characteristic value are each representative of a complex AC impedance of the cell in this case.

In order to determine the first and/or second impedance characteristic value, it is possible to respectively capture, in particular, a measured value which is representative of the complex AC impedance of the cell. The measured value is obtained, for example, by applying an AC voltage signal to the cell, capturing time samples of voltage and current data, windowing the voltage and current data to a corresponding time range, and carrying out a fast Fourier transform on the basis of the windowed voltage and current data in order to identify the voltage and current magnitudes at a specific frequency and to calculate the complex AC impedance of the cell therefrom.

In a step C1) following step B1), a first temperature characteristic value is determined on the basis of the first impedance characteristic value and a second temperature characteristic value is determined on the basis of the second impedance characteristic value. In this case, the first temperature characteristic value and the second temperature characteristic value are each representative of a temperature of the cell.

In order to determine the first and/or second temperature characteristic value, it is possible to use a lookup table, in particular. Such a lookup table comprises, for instance, an associated temperature characteristic value for respective impedance characteristic values. The above-mentioned specific frequency and/or a state of charge of the cell may be used, for example, as an additional variable for determining the temperature characteristic value. Alternatively or additionally, impedance features, such as a real part, an imaginary part, an amplitude or a phase of the complex AC impedance of the cell, may be assigned, in particular, to the temperature characteristic values stored in the lookup table.

After step C1), in a step D1), a deviation $|\Delta T|=|T_1-T_2|$ of the first temperature characteristic value $T_1$ from the second temperature characteristic value $T_2$ is determined.

Finally, in a step E1), the charging current for the cell is reduced if the deviation $|\Delta T|$ exceeds a predefined temperature threshold value $T_{TH}$. The temperature threshold value may be, for example, between 1° and 4° C., in particular 2° C.

This aspect of the invention is based on the knowledge that the two temperature characteristic values are identical or substantially identical during normal cell use. In contrast, if a cell is charged with damaging currents, the temperature characteristic values differ from one another since the charging mode has already changed the cell at this point in time to such an extent that the model conditions for converting the impedance into the temperature have been violated. If a critical difference is exceeded, the currents are therefore reduced, culminating in complete termination of the charging mode, thus preventing further damage to the battery store. A loss in capacity of the cell that is caused by briefly exceeding the temperature threshold value is negligibly low in this case.

Damage to battery cells on account of a charging operation can therefore be advantageously largely prevented and it is therefore possible to contribute to a safe and simultaneously efficient charging operation. In particular, different aging paths of the battery cells are taken into account with the proposed method. It is therefore possible to reduce a derivative action between a theoretically maximum possible charging current and a computationally maximum possible charging current, for which the cell respectively remains undamaged. As a result, it is possible to dispense with a complex, controlled charging method with a high parameterization outlay and additionally required computing capacity on a battery control unit.

In one configuration according to the first aspect, the first impedance characteristic value is representative of a first impedance feature with respect to a first frequency at a first point in time. Moreover, the second impedance characteristic value is representative of the same first impedance feature with respect to a second frequency that differs from the first frequency at the same first point in time. In this case, the first impedance feature denotes a real part, an imaginary part, an amplitude or a phase of the complex AC impedance of the cell. The second impedance feature likewise denotes one of a real part, an imaginary part, an amplitude or a phase of the complex AC impedance of the cell.

In one configuration according to the first aspect, the first impedance characteristic value is representative of a first impedance feature with respect to a first frequency at a first point in time. Moreover, the second impedance characteristic value is representative of a second impedance feature, which differs from the first impedance feature, with respect to the same first frequency at the same first point in time. In this case, the first impedance feature denotes a real part, an imaginary part, an amplitude or a phase of the complex AC impedance of the cell. The second impedance feature likewise denotes a real part, an imaginary part, an amplitude or a phase of the complex AC impedance of the cell.

In one configuration according to the first aspect, step B1) comprises a step B1-1) in which a first measured value is captured at the first point in time and the first impedance characteristic value is determined on the basis of the first measured value. In this case, the first measured value is representative of a complex AC impedance of the cell.

Step B1) also comprises a step B1-2) in which at least two second measured values are captured at second points in time which differ from the first point in time, and the second impedance characteristic value with respect to the first point in time is determined on the basis of the at least two second measured values by interpolating the at least two second measured values. In this case, the at least two second measured values are each representative of a complex AC impedance of the cell.

Alternatively, in step B1-2), only one second measured value can also be captured at the first point in time and the second impedance characteristic value can be determined on the basis of the second measured value.

In one configuration according to the first aspect, the charging mode is a fast-charging mode or ultrafast-charging mode of the cell. The fast-charging mode involves, for example, a C-rate of at least 2C being achieved. The ultrafast-charging mode involves, for example, a C-rate of at least 3C being achieved. However, the state of charge may also be important here. In the case of a low SOC of 20%, for example, it is often possible to carry out charging at 3C without any problems, but, in the case of higher SOCs, for example 80%, this may not be possible without damage. A similar situation applies to the temperature, wherein it may be advantageous to reduce the current here at low temperatures of <15° C. However, it is generally possible to refer to fast charging at average charging rates of 2C.

Explanations given in connection with the first aspect are likewise used for the same terms or similar features below, unless described otherwise.

According to a second aspect, the invention relates to a method for charging or discharging a cell of an electric energy store.

In the method, in a step A2), the cell is changed to a quiescent phase in which current is neither supplied to the cell nor tapped off from the cell.

Then, in a step B2) following step A2), a first impedance characteristic value and a second impedance characteristic value are determined during the quiescent phase. In this case, the first impedance characteristic value and the second impedance characteristic value are each representative of a complex AC impedance of the cell.

In a step C2) following step B2), a first impedance characteristic value, which is normalized with respect to a predefined boundary condition, is determined on the basis of the first impedance characteristic value and a second impedance characteristic value, which is normalized with respect to the predefined boundary condition, is determined on the basis of the second impedance characteristic value.

Normalization with respect to a boundary condition is understood here and below as meaning a conversion of the impedance characteristic values to impedance characteristic values during operation of the cell under normal conditions, that is to say important factors which influence the complex AC impedance of the cell, such as a state of charge and a temperature of the cell, are taken into account. Under normal conditions can denote, for instance, operation of the cell at a temperature of 25° C. and a state of charge of 50%.

After step C2), in a step D2), a change in the first normalized impedance characteristic value $I_1$ with respect to the second normalized impedance characteristic value $I_2$ is determined and a deviation $|\Delta I|=|(I_1-I_2)-(I_{Ref1}-I_{Ref2})|$ of this change $I_1-I_2$ from a change $I_{Ref1}-I_{Ref2}$ in a first impedance reference value $I_{Ref1}$ with respect to a second impedance reference value $I_{Ref2}$ of a predefined impedance profile $I_{Ref}$ is determined.

Finally, in a step E2), a charging and/or discharging profile is adapted in such a manner that the current to be supplied to the cell or to be tapped off from the cell is reduced if the deviation $|\Delta I|$ exceeds a predefined impedance threshold value $I_{TH}$. The predefined impedance threshold value $I_{TH}$ is, for example, between 1 µΩ and 5 µΩ, in particular 2.5 µΩ.

A predefined impedance profile $I_{Ref}$ is understood as meaning, in particular, an expected profile of the complex AC impedance of the cell during operation under normal conditions based on a specific frequency, in particular based on the same impedance features on which the impedance characteristic values are based. In the case of battery cells based on lithium ion technology, a decrease in the real part of the complex AC impedance can therefore be observed in the first 100 charging cycles; the real part then usually increases again. If the cell is exposed to damaging operation, there may be a greater increase in the real part or a smaller decrease in the real part in the first charging cycles.

In other words, this aspect of the invention is based on the knowledge that a change in the complex AC impedance may be used as an indicator of damaging operation by observing the complex AC impedance of the cell in quiescent phases. Operating limits of the cell can then be adapted, in particular with regard to charging and discharging of the cell. In this case, it is therefore also taken into account that the complex AC impedance of the cell likewise changes during normal operation, but takes place in a comparatively faster manner or with an opposite sign, for example, as a result of damaging currents.

One-off damage to battery cells on account of charging or discharging operations can therefore be advantageously detected and subsequent damage can be accordingly prevented, thus making it possible to contribute to safe and simultaneously efficient charging and discharging.

In one configuration according to the second aspect, the first impedance characteristic value is representative of a first impedance feature with respect to a first frequency at a first point in time. Moreover, the second impedance characteristic value is representative of the same first impedance feature with respect to the same first frequency at a second point in time that differs from the first point in time. In this case, the first impedance feature denotes a real part, an imaginary part, an amplitude or a phase of the complex AC impedance of the cell. The second impedance feature likewise denotes one of a real part, an imaginary part, an amplitude or a phase of the complex AC impedance of the cell.

In one configuration according to the first or second aspect, the first frequency is selected to be above 500 Hz. Moreover, the first frequency is selected to be above 500 Hz. In particular, the first frequency and the second frequency are between 500 Hz and 10,000 Hz.

According to a third aspect, the invention relates to an apparatus for charging or discharging a cell of an electric energy store. In this case, the apparatus is configured to carry out a method according to the first and/or second aspect. The apparatus may also be referred to as a battery control unit.

According to a fourth aspect, the invention relates to a system comprising an apparatus according to the third aspect, an electric energy store having at least one cell and a measurement apparatus which is coupled to the apparatus according to the third aspect and to the at least one cell of the electric energy store and is configured in a controllable manner to capture a complex AC impedance of the at least one cell and to make it available to the apparatus according to the third aspect as a measured value. The measurement apparatus may be, for example, an IC which is able to determine the complex AC impedance of individual battery cells with sufficient accuracy. A resolution in the range of 1 $\mu\Omega$–2 $\mu\Omega$ is considered to be sufficiently accurate here and a repetition accuracy should advantageously be in the range between 2-5 $\mu\Omega$, in particular. However, the measurement uncertainty may be considerably greater. Since the method advantageously comprises conversion to another variable (the temperature) and these characteristic curves are adapted in a cell-specific and therefore chip-specific manner, a systematic deviation is eliminated again using the characteristic curve itself.

In one configuration according to the fourth aspect, the electric energy store is a lithium ion battery for an electric vehicle.

According to a fifth aspect, the invention relates to an electric vehicle comprising a system according to the fourth aspect, an electrical load and a charging interface. The electrical load and the charging interface are coupled to the electric energy store in this case. The apparatus according to the third aspect that is included in the system according to the fourth aspect is also configured to control a charging current to be supplied to the electric energy store via the charging interface. Alternatively or additionally, the apparatus according to the third aspect that is included in the system according to the fourth aspect is configured to control an operating current to be tapped off from the electric energy store for the electrical load.

According to a sixth aspect, the invention relates to a computer program for charging or discharging a cell of an electric energy store, comprising instructions which, when the computer program is executed by a computer, cause the latter to carry out the method according to the first and/or second aspect.

According to a seventh aspect, the invention relates to a computer-readable storage medium on which the computer program according to the sixth aspect is stored.

Exemplary embodiments of the invention are explained in more detail below on the basis of the schematic drawings.

DETAILED DESCRIPTION OF THE DRAWINGS

Elements of identical construction or function are indicated using the same reference signs throughout the figures.

Fast-charging of batteries based on lithium ion technology can be carried out using predefined charging profiles, for example. In order to avoid damage to the battery cells, the charging profiles can be adapted in this case on the basis of the age. Further, more complicated methods provide for the use of a model and the adaptive adjustment of the model (for example US 2011/0285356 A1). In the laboratory, one-off damage to battery cells on account of a charging operation can be easily detected using highly accurate charging and discharging, and further damage to the battery store can therefore be prevented by adjusting the charging profile. The one-off loss in capacity is in the thousandths range in this case.

When using predefined profiles and adjustment using an aging indicator, for example the remaining residual capacity, the different aging paths of the cell are not taken into account, inter alia since the internal resistance of the cell is not clearly reversibly dependent on the residual capacity.

A derivative action must therefore be formed in order to ensure safe and non-damaging charging of the battery for all aging paths. More complex, controlled charging methods based on models require a high parameterization outlay and require additional computing capacity on a battery control unit. Highly precise charging and discharging of an entire energy store of an electric vehicle is scarcely possible during operation and also cannot be expected of the user of the electric vehicle since the possible use or readiness for use of the electric vehicle is greatly restricted thereby.

Novel measurement apparatuses make it possible to determine the impedance of the cells with sufficient accuracy in order to thus optimize fast charging and enable further diagnoses with respect to degradation.

Figure 1:
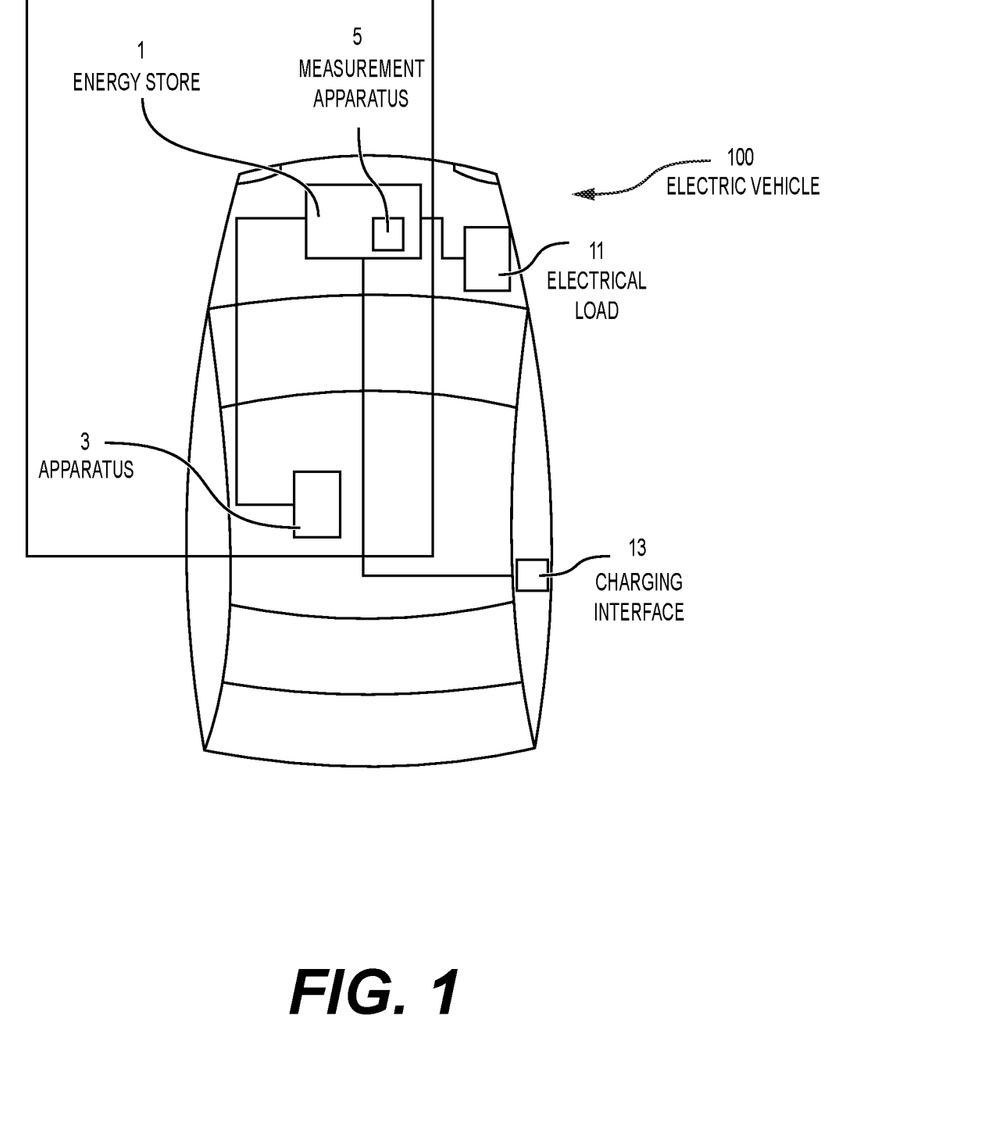
FIG. 1 shows an electric vehicle having an apparatus for charging or discharging a cell of an electric energy store of the electric vehicle.

An apparatus 3 according to an embodiment of the invention for charging a cell of an electric energy store 1 of an electric vehicle 100 and a corresponding system 10 and an electric vehicle 100 are described on the basis of FIG. 1.

In addition to the apparatus 3 and the energy store 1 having one or more cells, the system 10 comprises at least one measurement apparatus 5, wherein at least one of the cells of the energy store 1 is assigned and coupled to at least one measurement apparatus 5. In particular, it is conceivable for a plurality of cells of the energy store 1 to be interconnected to form a cell group and to be monitored by a measurement apparatus 5. The measurement apparatus 5 is also coupled to the apparatus 3 and is configured to provide the latter with a measured value that is representative of a complex AC impedance of the monitored cell(s).

In addition to the system 10, the electric vehicle 100 has an electrical load 11 and a charging interface 13. One or more electric motors of the drive of the electric vehicle 100 come into consideration as an electrical load 11, in particular. The electrical load 11 and the charging interface 13 are coupled to the energy store 1.

It is proposed to monitor the complex AC impedance of the cells in the electric vehicle during the fast-charging operation and also in quiescent phases. In this case, a frequency range above 500 Hz has proved to be useful. Calculating two cell temperatures from the real and imaginary parts of the complex AC impedance makes it possible to determine two temperatures which are identical during normal cell use. If a cell is charged with damaging currents, the temperatures differ from one another, with the result that the charging can be stopped or the currents can be reduced if a critical difference is exceeded, as explained in more detail below on the basis of the flowchart in FIG. 2. Furthermore, a change in the complex AC impedance may be used as an indicator of damaging operation by observing the complex AC impedance in quiescent phases, with the result that operating limits can then be adapted, as described in detail on the basis of the flowchart in FIG. 3. In this case, it is taken into account that the impedance of the cell also changes during normal operation and changes either more quickly or even with an opposite sign as a result of the damaging operation.

In this context, the apparatus 3 is assigned a data and program memory which stores at least one of the programs described below on the basis of the flowcharts in FIGS. 2 and 3.

Figure 2:
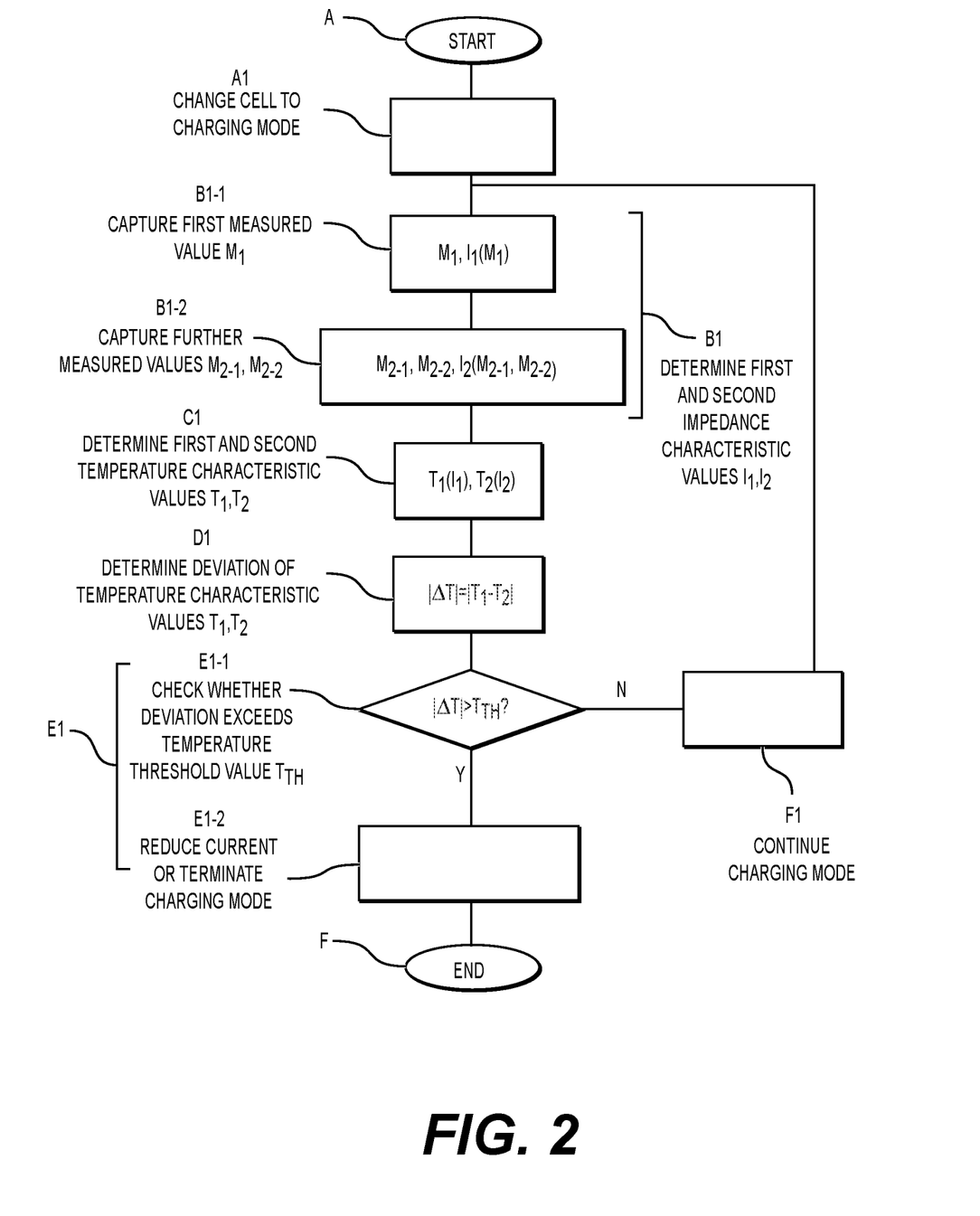
FIG. 2 shows a method for charging a cell of an electric energy store of the electric vehicle.

The program according to FIG. 2 starts in a step A) in which variables are initialized, for example. The program is then continued in a step A1) in which the cell is changed to a charging mode and a charging current is supplied to the cell. By way of example, a start of the program is initiated in this context by coupling the charging interface 13 to an external energy source.

The program is then continued in a step B1) in which a first and a second impedance characteristic value $I_1$, $I_2$ are determined. For example, two measured values $M_1$, $M_2$ are captured by the measurement apparatus 5 for this purpose and are made available to the apparatus 3, which measured values are representative of the complex AC impedance of a cell at a first point in time. For example, the measured values $M_1$, $M_2$ are measured at the same time. In a manner deviating from this, FIG. 2 is used to illustrate a situation in which a simultaneous measurement is not possible. In this case, a first measured value $M_1$ is first of all (step B1-1)) captured at the first point in time and is taken as a basis for determining the first impedance characteristic value $I_1$. Moreover (step B1-2)), at least two further measured values $M_{2-1}$, $M_{2-2}$ are captured (preferably in each case before and after the first point in time) and are made available to the apparatus 3, which measured values are likewise representative of the complex AC impedance of the cell. In order to determine the second impedance characteristic value $I_2$, the further measured values $M_{2-1}$, $M_{2-2}$ are interpolated to the same time base in order to thus enable a comparison with the first impedance characteristic value Ii at a common point in time. The impedance characteristic values $I_1$, $I_2$ are then used as a basis of the comparison and as a basis for a statement regarding whether the current needs to be reduced during fast charging.

The first impedance characteristic value $I_1$ comprises one of the following impedance features with respect to a predefined frequency at the first point in time: real part, imaginary part, amplitude or phase of the complex AC impedance of the cell.

In a first embodiment variant, the second impedance characteristic value $I_2$ comprises the same impedance feature with respect to a different frequency at the first point in time.

In a second embodiment variant, the second impedance characteristic value $I_2$ comprises, in contrast, a different impedance feature with respect to the same predefined frequency at the first point in time.

In any case, two different impedance features (Re, Im, Abs or phase) or the same impedance features at different frequencies are therefore involved.

The two impedance characteristic values are, for example, the real and imaginary parts of the impedance measurement at a frequency of 3125 Hz or, for example, two imaginary parts at different frequencies.

The program is then continued in a step C1) in which a first and a second temperature characteristic value $T_1$, $T_2$, which are each representative of a temperature of the cell, are determined on the basis of the impedance characteristic values $I_1$, $I_2$. The impedance values are converted to a cell temperature with the aid of a lookup table, for example (cf., for example, DE 10 2013 103 921 A1).

The program is then continued in a step D1) in which a deviation $|\Delta T|=|T_1-T_2|$ of the temperature characteristic values $T_1$, $T_2$ is determined.

The program is then continued in a step E1) in which a check is first of all (step E1-1)) carried out in order to determine whether the determined deviation $|\Delta T|$ exceeds a predefined temperature threshold value $T_{TH}$.

If the check reveals that the deviation $|\Delta T|$ exceeds the predefined temperature threshold value $T_{TH}$, the program is continued in a step E1-2) and otherwise the program is continued in a step F1.

In step E1-2), the charging current is reduced or the charging mode is terminated. In a subsequent step F), the method is then terminated.

In step F1), the charging mode is continued with an unchanged charging current or, depending on the charging profile, possibly with an increased charging current. The program can then be continued, for example, after a predefined period of time in step B1) in order to continue to monitor the charging mode.

For example, as a result of the program steps described, an impedance measurement is carried out during the fast charging of the electric vehicle and the cell-internal temperature is respectively determined from the measured impedance and the function $T_{Re}(\text{Re}(Z))$ and $T_{Im}(Z))$. If the difference $T_{Re}-T_{Im}$ is greater than the temperature threshold value $T_{TH}$, the charging profile is adapted. Moreover, it is possible to adjust the function in phases of thermal equilibrium (for example electric vehicle 100 has been stationary for 20 minutes). It is likewise conceivable to generalize the function to other operating ranges (for example discharging at a high rate).

Figure 3:
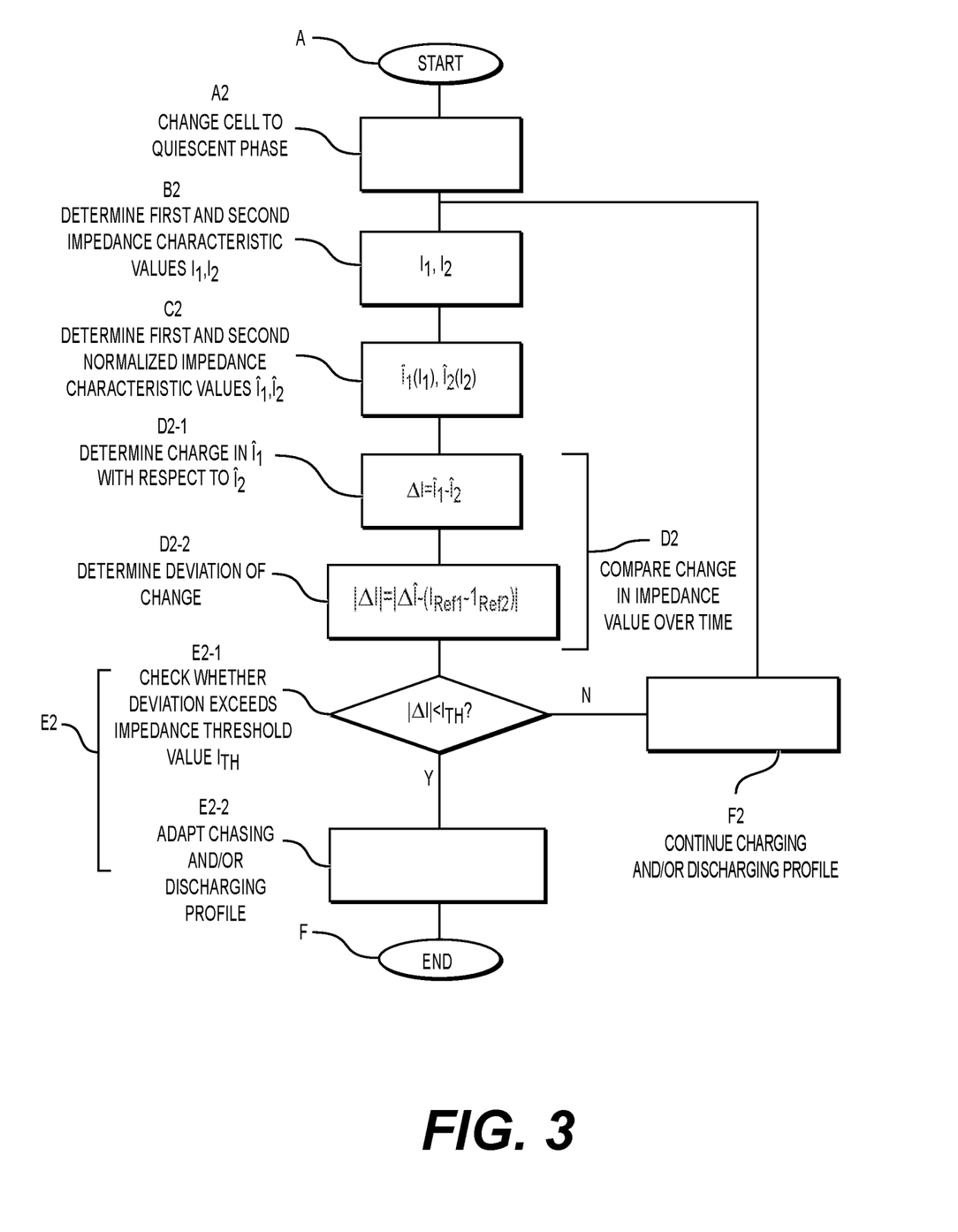
FIG. 3 shows a method for charging or discharging a cell of an electric energy store of the electric vehicle.

The program according to FIG. 3 starts in a step A) in which variables are initialized, for example. The program is then continued in a step A2) in which the cell is changed to a quiescent phase and no charging current is supplied to the cell via the charging interface 13 and no operating current for operating the electrical load 11 is drawn. For example, a start of the program is initiated in this context by terminating a charging or operating process of the electric vehicle 100.

The program is then continued in a step B2) in which a first and a second impedance characteristic value $I_1$, $I_2$ are determined. For example, a first measured value $M_1$, which is representative of the complex AC impedance of the cell at a first point in time, and a second measured value $M_2$, which is representative of the complex AC impedance of the cell at a second point in time, are captured by the measurement apparatus 5 for this purpose and are made available to the apparatus 3. For example, the measured values $M_1$, $M_2$ are measured at the same time. The impedance characteristic values $I_1$, $I_2$ are then used as a basis of the comparison and as a basis for a statement regarding whether the current needs to be reduced during fast charging.

The first impedance characteristic value Ii comprises one of the following impedance features with respect to a predefined frequency at the first point in time: real part, imaginary part, amplitude or phase of the complex AC impedance of the cell.

The second impedance characteristic value $I_2$ comprises the same impedance feature with respect to the same frequency at the second point in time.

In any case, two identical impedance features (Re, Im, Abs or phase) at the same frequency at different points in time are therefore involved.

The two impedance characteristic values are, for example, two real or imaginary parts of the impedance measurement at a frequency of 781 Hz.

The program is then continued in a step C2) in which a first and a second normalized impedance characteristic value $\hat{I}_1$, $\hat{I}_2$, which are each representative of the complex AC impedance of the cell under normal conditions of 25° C. and an SOC of 50%, are determined on the basis of the impedance characteristic values $I_1$, $I_2$. On account of this conversion, it is preferable to record the measured values when the vehicle is stationary (current=0, homogeneous temperature).

The program is then continued in a step D2) in which a change $\Delta\hat{I}=\hat{I}_1-\hat{I}_2$ in the first normalized impedance characteristic value $\hat{I}_1$ with respect to the second normalized impedance characteristic value $\hat{I}_2$ is first of all (step D2-1)) determined. In a step D2-2), a deviation $|\Delta I|=|\Delta\hat{I}-(I_{Ref1}-I_{Ref2})|$ this change $\Delta\hat{I}$ from a change in a first impedance reference value $I_{Ref1}$ with respect to a second impedance reference value $I_{Ref2}$ of a predefined impedance profile $I_{Ref}$, which results, for instance, from an expected impedance profile, is then determined.

In step D2), the change in the impedance value over time, for example the real part, is compared. In contrast to step D1), the sign of the change $\Delta\hat{I}$ may also be reversed in this case. If a trend that differs from the normal profile occurs, damage to the cell may be inferred. In this case, the normal profile may show a reduction for the real part in the first 100 cycles and may only then show an increase.

The program is then continued in a step E2) in which a check is first of all (step E2-1)) carried out in order to determine whether the determined deviation $|\Delta I|$ exceeds a predefined impedance threshold value $I_{TH}$.

If the check reveals that the deviation $|\Delta I|$ exceeds the predefined impedance threshold value $I_{TH}$, the program is continued in a step E2-2), and otherwise the program is continued in a step F2).

In step E2-2), the charging and/or discharging profile is adapted in such a manner that the maximum current to be supplied to the cell during subsequent charging operations or the maximum current to be tapped off from the cell during subsequent discharging operations is reduced. In a subsequent step F), the method is then terminated.

In step F2), the charging and/or discharging profile is continued without change. The program can then be continued, for example after a predefined period of time in which a charging mode and/or a driving mode of the electric vehicle may have been carried out, in step A2) in order to enable further monitoring of the energy store.

For example, as a result of the program steps described, an impedance measurement is carried out in the quiescent phase of the electric vehicle, wherein the impedance is measured under equilibrium conditions (open-circuit voltage and temperature). Moreover, the rate of change of the impedance (real or imaginary part) can be determined and the rate of change can be compared with conventional values.

The overview of the test sequence (FIG. 4) illustrates a plurality of fast-charging cycles (P1-P10) with a different intensity or harmfulness of a charging voltage U over time t [data].

Figure 5:
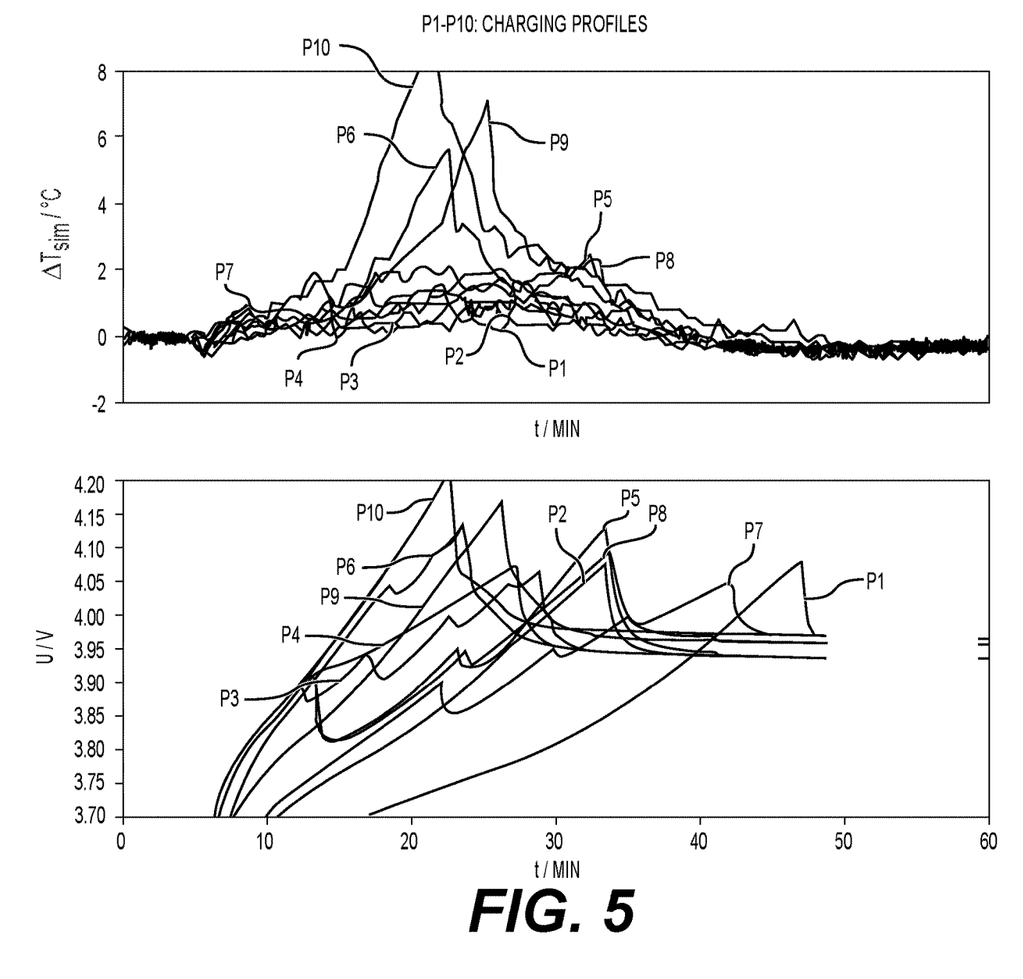
FIG. 5 shows a temperature estimation according to the method described on the basis of FIG. 2.

From the temperature estimation according to the method described on the basis of FIG. 2 from the real part and imaginary part (FIG. 5) at a frequency of f=3125 Hz, profiles 6, 9 and 10 show significant deviations $\Delta T_{sim}$ of the temperatures determined separately from the imaginary part and the real part. This leads to the conclusion that the model used for the estimation does not suffice in comparison with other profiles, which presumably can be attributed to so-called "plating". Moreover, it can be seen that profiles P5 and P8 achieve a greater deviation $\Delta T_{sim}$ just before charging is complete.

Figure 6:
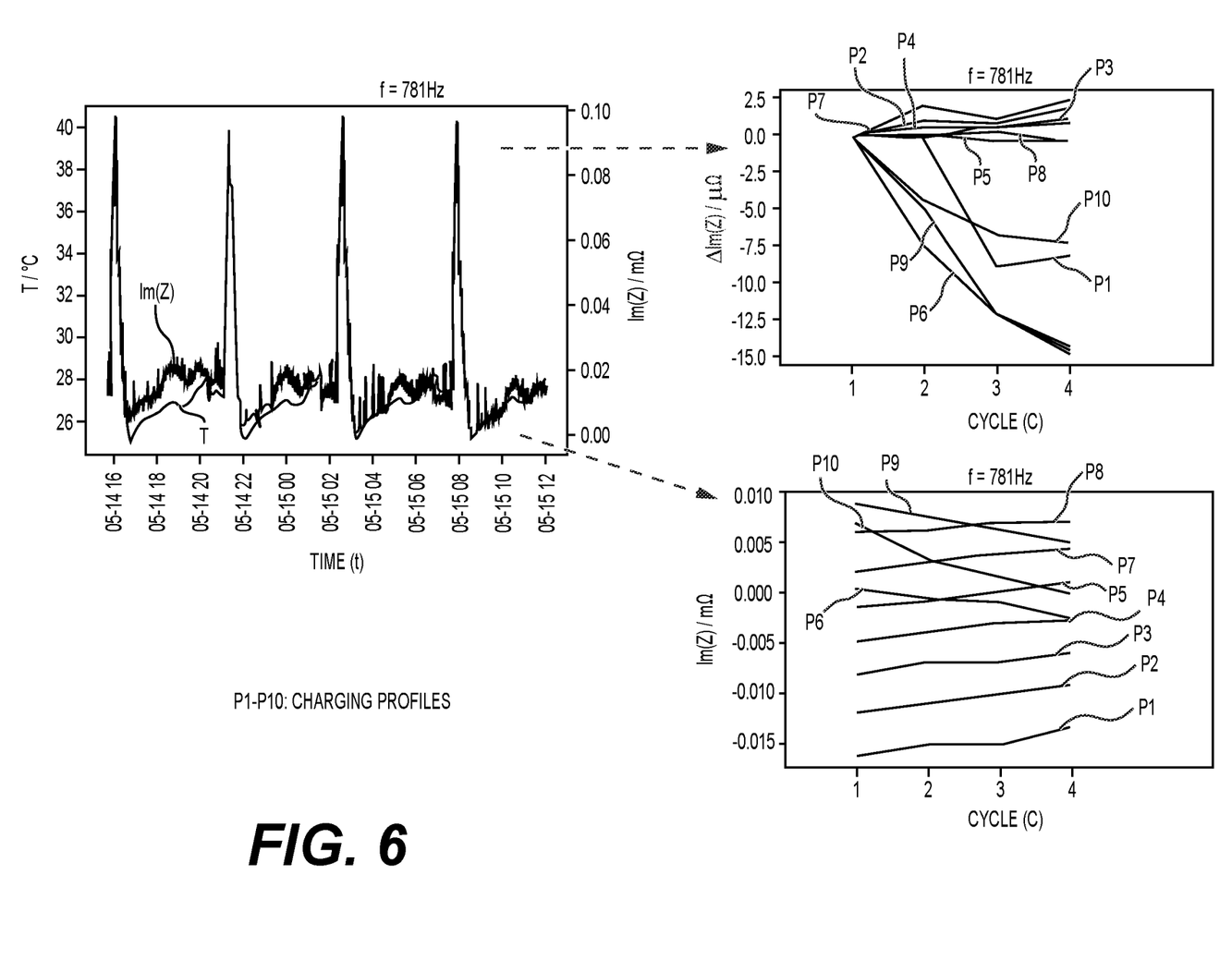
FIG. 6 shows a profile of the imaginary part according to the method described on the basis of FIG. 3, the difference between the maxima and the difference between the minima.

FIG. 6 (on the left) is used to illustrate the development of the imaginary part according to the method described on the basis of FIG. 3 at a frequency of f=781 Hz of the profile P10. If the maximum is considered, a maximum temperature T respectively results depending on the profile. A difference between the maxima within a respective cycle c is illustrated at the top right for the profiles P1-P10. In this case, as can be seen, the impedance Z changes greatly and contrary to the trend in the profiles P6, P9 and P10.

Profile P1 likewise shows a behavior that differs from the norm in the temperature peak (artefact).

If the minimum in FIG. 6 (on the left) is considered, a lowest, constant temperature T respectively results independently of the profile. A difference between the minima within a respective cycle c is illustrated at the bottom right for the profiles P1-P10. In this case, the inductance generally increases (capacity falls), and the normal profile corresponds to a continuous trend. The impedance Z changes greatly and contrary to the trend in the profiles P6, P9 and P10.

Figure 7:
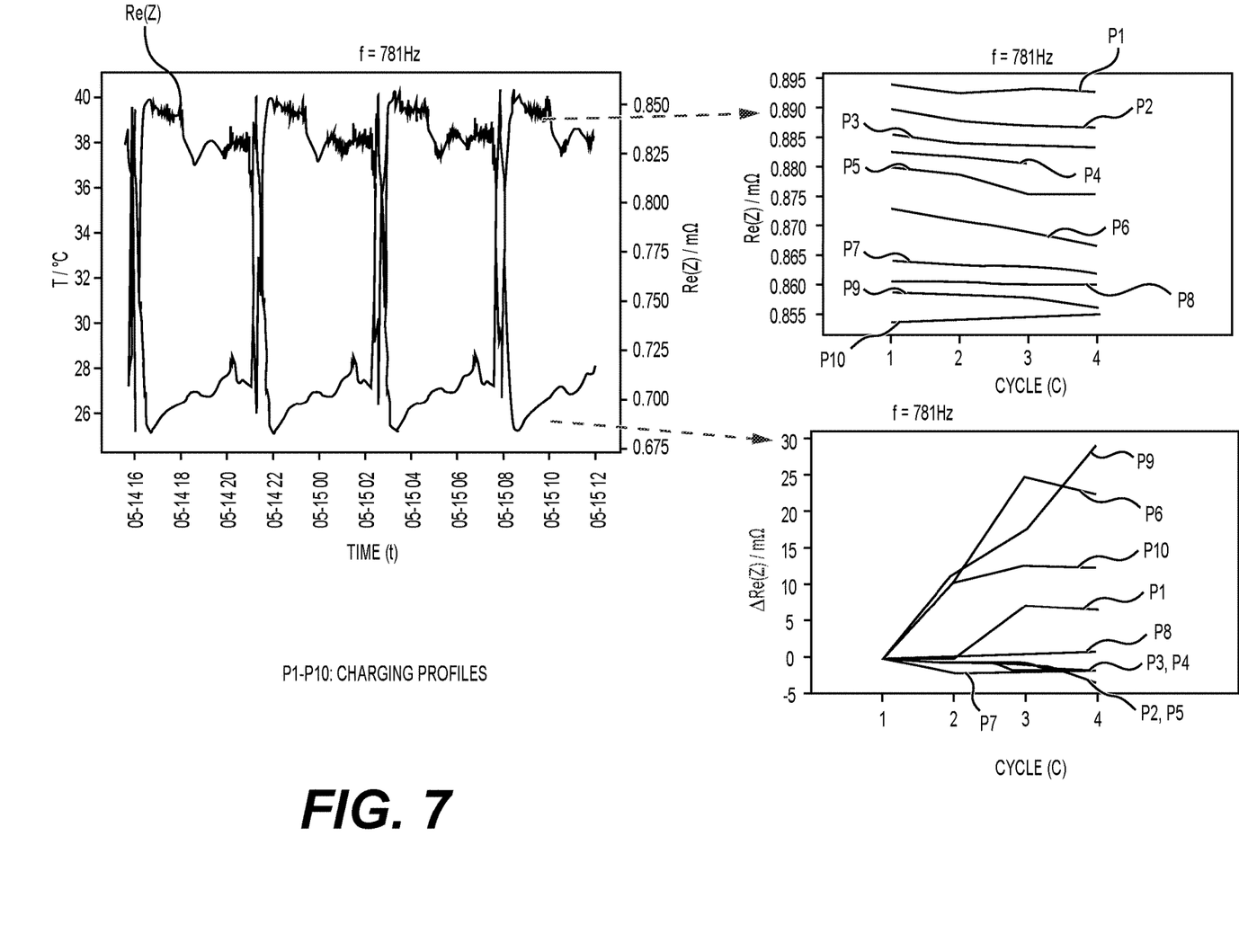
FIG. 7 shows a profile of the real part according to the method described on the basis of FIG. 3, the difference between the maxima and the difference between the minima.

FIG. 7 (on the left) is used to illustrate the development of the real part according to the method described on the basis of FIG. 3 at a frequency of f=781 Hz of the profile P10. If the maximum is considered, a lowest, constant temperature T respectively results independently of the profile. A difference between the maxima within a respective cycle c is illustrated at the top right for the profiles P1-P10. In this case, the real part falls over the cycles c. In contrast to the imaginary part in profile P6, no change contrary to the trend can be observed here and the change contrary to the trend can be determined only in profile P10.

If the minimum in FIG. 7 (on the left) is considered, a maximum temperature T respectively results depending on the profile. A difference between the minima within a respective cycle c is illustrated at the bottom right for the profiles P1-P10. In this case, the real part within a profile increases for profiles P6, P9 and P10.

Figure 8:
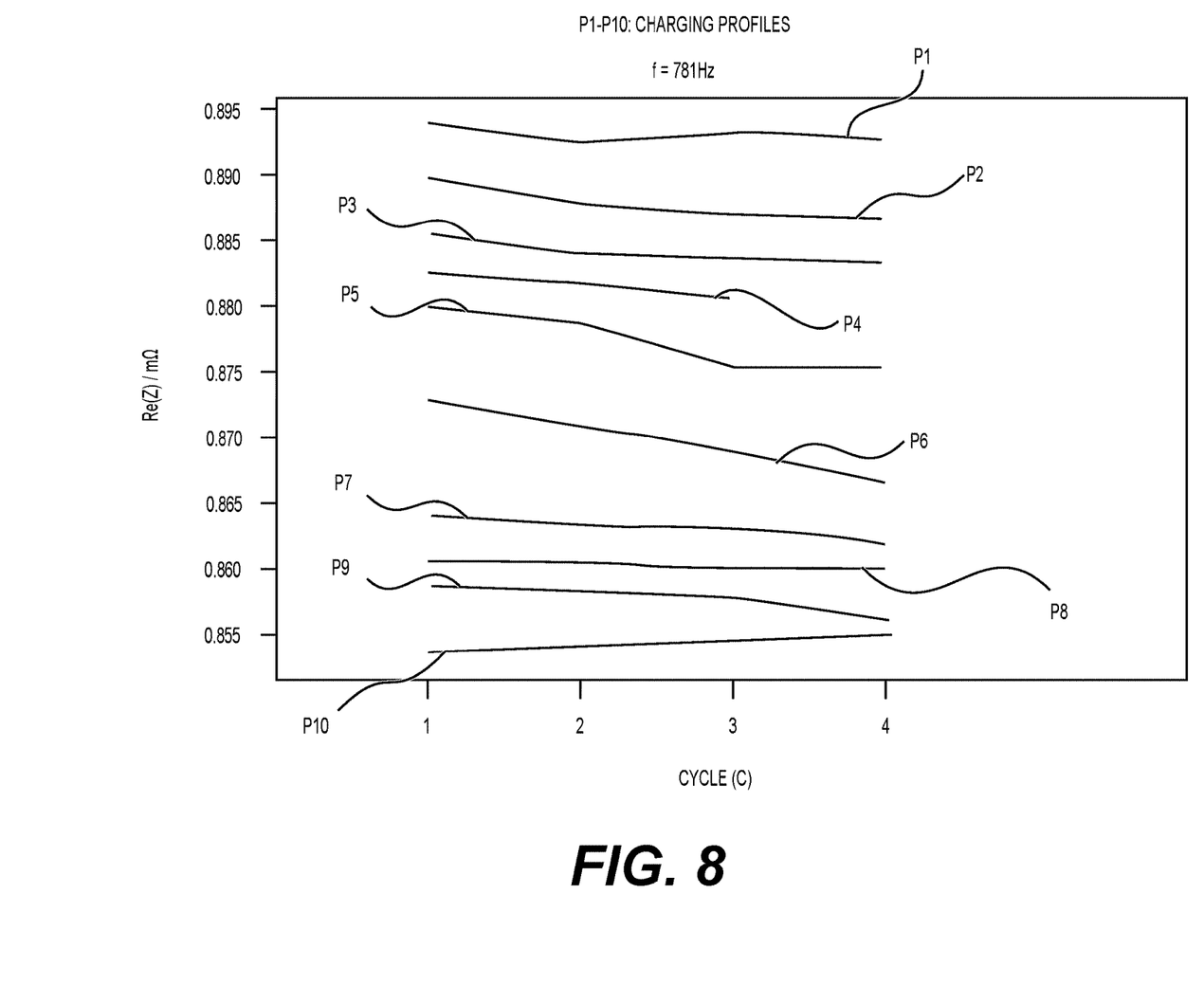
FIG. 8 shows changes in the impedance of a cell over a plurality of cycles.

FIG. 8 is used to illustrate changes in the impedance Z over a plurality of cycles c.

Figure 4:
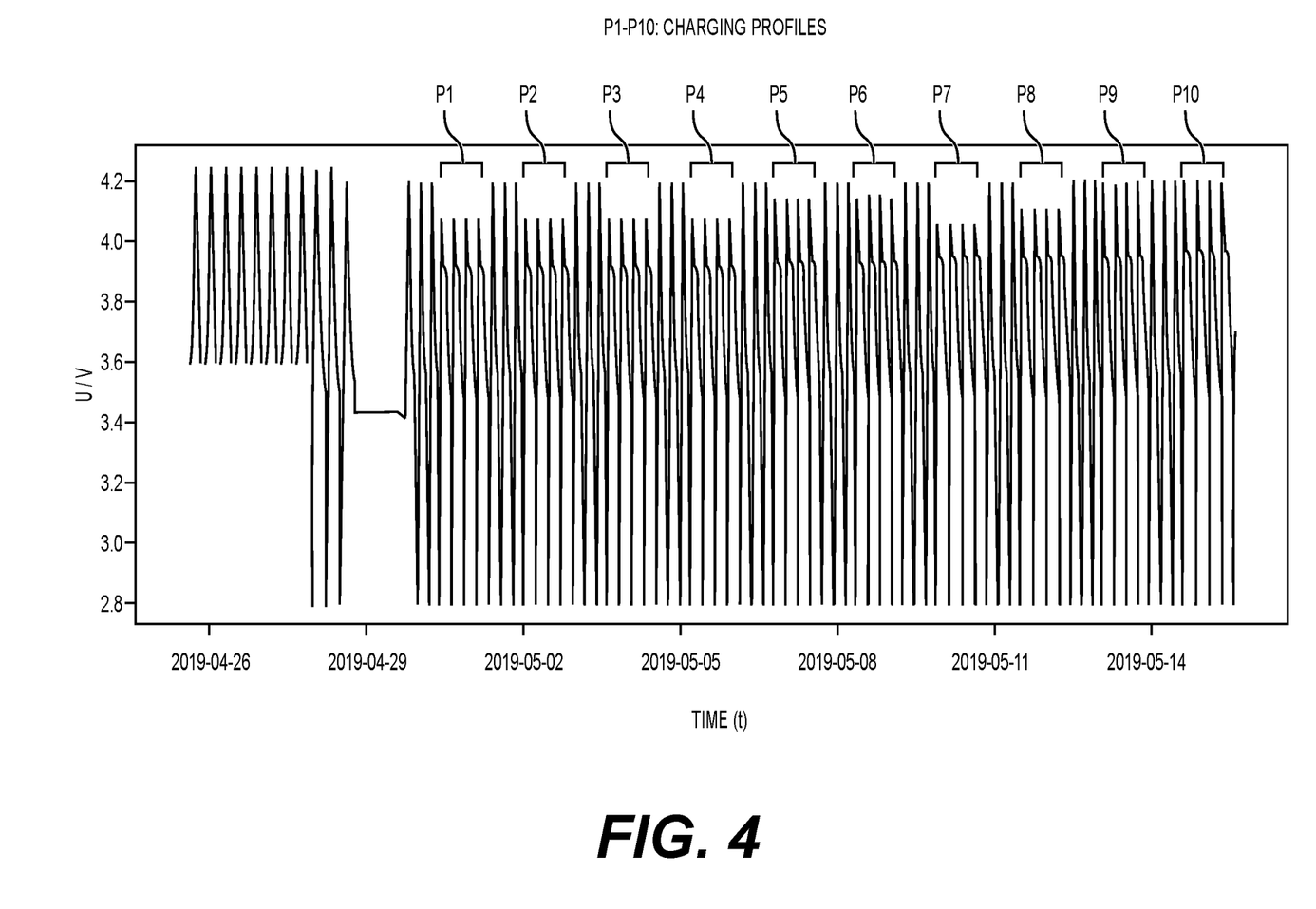
FIG. 4 shows an overview of a test sequence of the methods according to FIGS. 2 and 3.

The charging profiles P1-P10 were run through with four cycles c in each case in accordance with their numbering, wherein three normal cycles were run in each case in between (cf. FIG. 4).

In the case of Li-ion cells, a decrease in the real part can generally be observed at high frequencies (here 781 Hz) in the first cycles c and the real part then increases again (depending on the respective cell, for example after 100 cycles c). If the cell is operated in a damaging range, the real part increases more significantly or decreases to a lesser extent in the first cycles c. This is the case here for the charging profiles P8 and P10.

LIST OF REFERENCE SIGNS

100 Electric vehicle
1 Energy store
3 Apparatus
5 Measurement apparatus
10 System
11 Load
13 Charging interface
$M_1$, $M_2$, $M_{2\text{-}1}$, $M_{2\text{-}2}$ Measured value
$I_1$, $I_2$ Impedance characteristic value
$\hat{I}_1$, $\hat{I}_2$ Normalized impedance characteristic value
$T_1$, $T_2$ Temperature characteristic value
T Temperature
$|\Delta T|, \Delta T_{sim}$ $|\Delta I|$ Deviation
$I_{Ref1}$, $I_{Ref2}$ Impedance reference value
$I_{Ref}$ Impedance profile
$I_{TH}$ Impedance threshold value
U Charging voltage
t Time
c Cycle
Z Impedance
P1-P10 Charging profile
A-F Program steps

What is claimed is:

1. A method for charging a cell of an electric energy store, the method comprising:
   changing the cell to a charging mode in which a charging current is supplied to the cell,
   determining a first impedance characteristic value and a second impedance characteristic value during the charging mode, wherein the first impedance characteristic value and the second impedance characteristic value are each representative of a complex AC impedance of the cell,
   determining a first temperature characteristic value based on the first impedance characteristic value and determining a second temperature characteristic value based on the second impedance characteristic value, wherein the first temperature characteristic value and the second temperature characteristic value are each representative of a temperature of the cell,
   determining a deviation of the first temperature characteristic value from the second temperature characteristic value, and
   reducing the charging current for the cell if the deviation exceeds a predefined temperature threshold value.

2. The method according to claim 1, wherein the charging mode is carried out as a fast-charging mode or an ultrafast-charging mode.

3. The method according to claim 1, wherein:
   the first impedance characteristic value is representative of a first impedance feature with respect to a first frequency at a first point in time,
   the second impedance characteristic value is representative of the first impedance feature with respect to a second frequency that differs from the first frequency at the first point in time, and
   the first impedance feature and the second impedance feature each comprise a real part, an imaginary part, an amplitude or a phase of the complex AC impedance of the cell.

4. The method according to claim 3, wherein determining the first impedance characteristic value and the second impedance characteristic value comprises:
   capturing a first measured value at the first point in time, wherein the first measured value is representative of the complex AC impedance of the cell, and determining the first impedance characteristic value based on the first measured value, and
   capturing at least two second measured values at second points in time which differ from the first point in time, wherein the at least two second measured values are each representative of the complex AC impedance of the cell, and determining the second impedance characteristic value with respect to the first point in time based on the at least two second measured values by interpolating the at least two second measured values.

5. The method according to claim 1, wherein:
   the first impedance characteristic value is representative of a first impedance feature with respect to a first frequency at a first point in time,
   the second impedance characteristic value is representative of a second impedance feature, which differs from the first impedance feature with respect to the first frequency at the first point in time, and
   the first impedance feature and the second impedance feature each comprise a real part, an imaginary part, an amplitude or a phase of the complex AC impedance of the cell.

6. The method according to claim 5, wherein determining the first impedance characteristic value and the second impedance characteristic value comprises:
   capturing a first measured value at the first point in time, wherein the first measured value is representative of the complex AC impedance of the cell, and determining the first impedance characteristic value based on the first measured value, and
   capturing at least two second measured values at second points in time which differ from the first point in time, wherein the at least two second measured values are each representative of the complex AC impedance of the cell, and determining the second impedance characteristic value with respect to the first point in time based on the at least two second measured values by interpolating the at least two second measured values.

7. An apparatus for charging or discharging a cell of an electric energy store, wherein the apparatus is configured to carry out the method according claim 1.

8. A system comprising:
   the apparatus according to claim 7,
   the electric energy store having at least one cell, and
   a measurement apparatus which is coupled to the apparatus and to the electric energy store, wherein the measurement apparatus is configured in a controllable manner to capture a complex AC impedance of the at least one cell and to make the complex impedance of the at least one cell available to the apparatus as a measured value.

9. The system according to claim 8, wherein the electric energy store is a lithium ion battery for an electric vehicle.

10. An electric vehicle comprising:
    the system according to claim 8,
    an electrical load, and
    a charging interface, wherein:
    the electrical load and the charging interface are coupled to the electric energy store, and
    the apparatus is configured to control a charging current to be supplied to the electric energy store via the charging interface and/or to control an operating current to be tapped off from the electric energy store for the electrical load.

11. A computer product comprising a non-transitory computer readable medium having stored thereon program code which, when executed on a computer, carries out a method of:
- changing the cell to a charging mode in which a charging current is supplied to the cell,
- determining a first impedance characteristic value and a second impedance characteristic value during the charging mode, wherein the first impedance characteristic value and the second impedance characteristic value are each representative of a complex AC impedance of the cell,
- determining a first temperature characteristic value based on the first impedance characteristic value and determining a second temperature characteristic value based on the second impedance characteristic value, wherein the first temperature characteristic value and the second temperature characteristic value are each representative of a temperature of the cell,
- determining a deviation of the first temperature characteristic value from the second temperature characteristic value, and
- reducing the charging current for the cell if the deviation exceeds a predefined temperature threshold value.

12. A method for charging or discharging a cell of an electric energy store, the method comprising:
- changing the cell to a quiescent phase in which no current is supplied to the cell or is tapped off from the cell,
- determining a first impedance characteristic value and a second impedance characteristic value during the quiescent phase, wherein the first impedance characteristic value and the second impedance characteristic value are each representative of a complex AC impedance of the cell,
- determining a first impedance characteristic value, which is normalized with respect to a predefined boundary condition, based on the first impedance characteristic value and determining a second impedance characteristic value, which is normalized with respect to the predefined boundary condition, based on the second impedance characteristic value,
- determining a first change in the first normalized impedance characteristic value with respect to the second normalized impedance characteristic value and determining a deviation of the first change from a second change in a first impedance reference value with respect to a second impedance reference value of a predefined impedance profile, and
- adapting at least one of a charging profile or a discharging profile such that current to be supplied to the cell or to be tapped off from the cell is reduced if the deviation exceeds a predefined impedance threshold value.

13. The method according to claim 12, wherein
the first impedance characteristic value is representative of a first impedance feature with respect to a first frequency at a first point in time,
the second impedance characteristic value is representative of the first impedance feature with respect to the same first frequency at a second point in time that differs from the first point in time, and
the first impedance feature and the second impedance feature each comprise a real part, an imaginary part, an amplitude or a phase of the impedance of the cell.

14. The method according to claim 13, wherein the first frequency and the second frequency are between 500 Hz and 10,000 Hz.

* * * * *